(12) United States Patent
Leonard (10) Patent No.: US 11,668,042 B2
(45) Date of Patent: Jun. 6, 2023

(54) MANIFOLD WITH A PLURALITY OF FLUID OUTLETS AND A DELIVERY HEAD

(71) Applicant: Brightwell Dispensers Limited, Newhaven (GB)

(72) Inventor: Marcus Alexander Leonard, Newhaven (GB)

(73) Assignee: Brightwell Dispensers Limited, Newhaven (GB)

( * ) Notice: Subject to any disclaimer, the term of this patent is extended or adjusted under 35 U.S.C. 154(b) by 440 days.

(21) Appl. No.: 16/836,724

(22) Filed: Mar. 31, 2020

(65) Prior Publication Data

US 2020/0362502 A1   Nov. 19, 2020

(30) Foreign Application Priority Data

Apr. 11, 2019   (GB) ..................................... 1905173

(51) Int. Cl.
| | |
|---|---|
| D06F 39/02 | (2006.01) |
| D06F 34/08 | (2020.01) |
| D06F 31/00 | (2006.01) |
| F16L 41/03 | (2006.01) |
| F16K 11/00 | (2006.01) |
| B01F 101/00 | (2022.01) |
| B67D 7/00 | (2010.01) |

(52) U.S. Cl.
CPC ............ *D06F 39/022* (2013.01); *D06F 31/00* (2013.01); *D06F 34/08* (2020.02); *F16K 11/00* (2013.01); *F16L 41/03* (2013.01); *B01F 2101/4505* (2022.01); *B67D 7/002* (2013.01)

(58) Field of Classification Search
CPC ... D06F 39/022; F16K 31/508; A47L 15/4418
See application file for complete search history.

(56) References Cited

U.S. PATENT DOCUMENTS

| | | | |
|---|---|---|---|
| 4,960,139 A | | 10/1990 | Rizzetto |
| 5,746,238 A | * | 5/1998 | Brady ..................... B01F 35/75 137/101.19 |
| 5,791,168 A | * | 8/1998 | Smock .................. D06F 39/028 68/17 R |
| 5,826,749 A | | 10/1998 | Howland et al. |
| 6,098,646 A | * | 8/2000 | Hennemann ............ D06F 39/02 137/554 |
| 6,382,035 B1 | | 5/2002 | Nichols |

(Continued)

FOREIGN PATENT DOCUMENTS

| | | |
|---|---|---|
| EP | 0 403 296 | 12/1990 |
| GB | 674376 | 6/1952 |
| GB | 2 322 356 | 8/1998 |

*Primary Examiner* — Reinaldo Sanchez-Medina
(74) *Attorney, Agent, or Firm* — Levy & Grandinetti (57) ABSTRACT

A manifold has a fluid inlet, a plurality of fluid outlets, a movable conduit member, a first drive mechanism, and a control module in which the conduit member has a fluid path therethrough, in which the fluid inlet is fluidly connected to a first end of the fluid path, in which the conduit member is mounted for movement on a support member, and in which the first drive mechanism is configured to move the conduit member on the support member to selectively associate a second end of the fluid path with one of the plurality of fluid outlets according to commands issued by the control module.

20 Claims, 4 Drawing Sheets

(56) References Cited

U.S. PATENT DOCUMENTS

| | | | |
|---|---|---|---|
| 6,689,621 B2 * | 2/2004 | Merten | B67C 3/206 |
| | | | 422/68.1 |
| 7,658,088 B2 * | 2/2010 | Walker | D06F 39/02 |
| | | | 68/17 R |
| 9,528,215 B2 * | 12/2016 | Tumini | D06F 39/02 |
| 10,456,008 B2 * | 10/2019 | Alexander | A47L 15/0055 |

* cited by examiner

MANIFOLD WITH A PLURALITY OF FLUID OUTLETS AND A DELIVERY HEAD

The present invention relates to a manifold with a plurality of fluid outlets and a delivery head, for use particularly, but not exclusively, to selectively direct chemical washing fluids to industrial washing machines.

Industrial laundry or washing facilities commonly comprise a plurality of washing machines, which are provided with the required chemical washing fluids by an external delivery system. Each machine sends periodic requests for chemicals to a main dosing unit according to its programmed wash cycle, and the main dosing unit then sends operation signals to one of a bank of pumps to pump an amount of concentrated chemical from a drum to the machine in question. The chemical can be delivered neat to the machine, but usually it is mixed with water from a mains supply at a dilution station first. Such an arrangement provides considerable advantages over the manual loading of chemicals into each machine prior to each wash cycle.

These kinds of external chemical delivery systems commonly use a complex manifold comprising a plurality of solenoid valves to selectively direct the diluted chemical washing fluid to the correct machine. The main dosing unit sends operation signals to the manifold so the solenoid associated with the washing machine in question is opened, and the diluted chemical washing fluid is directed thereto. However, these manifolds suffer from a number of problems. Firstly, the internal volume of the manifold is relatively large and is fully flooded with diluted chemical washing fluid whichever of the solenoids is opened. This means that the whole manifold has to be flushed with water between deliveries. Secondly, solenoid valves are expensive and relatively unreliable. The present invention is intended to address some of these problems.

Therefore, according to a first aspect of the present invention a manifold comprises a fluid inlet, a plurality of fluid outlets, a movable conduit member, a first drive mechanism and a control module, in which said conduit member comprises a fluid path therethrough, in which said fluid inlet is fluidly connected to a first end of said fluid path, in which said conduit member is mounted for movement on a support member, and in which said first drive mechanism is configured to move said conduit member on said support member to selectively associate a second end of said fluid path with one of said plurality of fluid outlets according to commands issued by said control module.

Thus, the present invention provides a new approach to selectively directing diluted chemical washing fluid to industrial washing machines by using a moving conduit member which moves between the fluid outlets, rather than having static manifold pipework and solenoid values controlling each fluid outlet.

The physical positions of the fluid outlets relative to the fluid inlet, and the manner of movement of the conduit member between the fluid outlets can be any suitable arrangement. For example, in one version of the invention the fluid outlets can be arranged radially around a central fluid inlet, a first end of the conduit member can be rotationally mounted to the fluid inlet, and the conduit member can be rotated in order to selectively associate the second end of the fluid path with the fluid outlets. As such, the movement of the conduit member can be rotational about an axis.

However, in a preferred embodiment the conduit member can comprise a delivery head, and the support member can comprise a track upon which the delivery head can be mounted for movement. As such, the whole delivery head, and the fluid path therethrough, can travel along the track.

The delivery head can comprise a shuttle carriage mounted for movement on the track, a connector member and a second drive mechanism. The connector member can comprise the fluid path therethrough, and a probe portion with the second end of the fluid path at an outer end thereof. The connector member can be mounted for movement on a guide provided at a front side of the shuttle carriage, and the second drive mechanism can be configured to move the connector member on the guide according to commands issued by the control module between a retracted position in which the delivery head can move freely on the track between the plurality of fluid outlets, and an advanced position in which the probe portion extends through one of the fluid outlets. Therefore, the delivery head travels back and forth on the track between the fluid outlets, and when it reaches the requisite position the probe moves down through the fluid outlet in order for fluid to be delivered correctly.

In the retracted position the outer end may be level with or above a lower surface of the shuttle carriage, and in the advanced position the probe portion may be proud of the lower surface and extend through one of the fluid outlets.

A fluid line may extend from the fluid inlet to a first end of the fluid path, to allow the whole delivery head and the fluid path therethrough to travel along the track. The first drive mechanism can then be configured to move the delivery head on the track to selectively associate a second end of the fluid path with one of the plurality of fluid outlets according to commands issued by the control module.

The plurality of fluid outlets can be arranged in any configuration which can be accessed by means of a track, including a curved configuration. However, preferably the plurality of fluid outlets can be arranged in a line, the track can be parallel to the line, and at least a portion of the fluid path which terminates at the second end thereof can be normal to the line. Further, the first drive mechanism can be configured to move the delivery head reciprocally on the track between positions in which the second end of the fluid path is aligned with one of the plurality of fluid outlets.

The guide can be any construction which can facilitate the reciprocal movement of the connector member. However, in a preferred embodiment the guide can comprise a plurality of guide shafts, and the connector member can comprise a body portion mounted to the guide shafts by means of a plurality of corresponding apertures formed therein. The probe portion can extend from the body portion parallel with the guide shafts, and the connector member can further comprise an arm portion which can be normal to the probe portion and which can have the first end of the fluid path at an outer end thereof. The fluid line can be mounted to the arm portion. Therefore, the fluid path through the connector member is generally L-shaped, with the fluid line being conveniently connected to the arm portion at 90 degrees to the probe portion which moves in and out of the fluid outlets. This arrangement positions the first end of the fluid path away from the guide shafts and the second drive mechanism, and allows for the fluid line to move freely up and down with the arm, as well as back and forth with the delivery head as a whole.

The second drive mechanism can be a linear motor mounted at one end of the guide, with a linear shaft thereof extending into the guide parallel with the guide shafts. The connector member can then comprise a socket in which the linear shaft can be mounted. This is a convenient and expedient arrangement for facilitating the movement of the connector member.

In a preferred construction a front side of the shuttle carriage can be parallel with the line, and the guide can comprise three guide shafts arranged in an isosceles triangle configuration with a hypotenuses side thereof parallel with the front side. The body portion of the connector member can be a corresponding isosceles triangle shape with the apertures at each corner thereof, and with the arm portion extending from a congruent side thereof at a normal angle thereto. This construction is compact while remaining structurally rigid.

The track upon which the delivery head moves can comprise a pair of parallel rods, and the shuttle carriage can be mounted to the rods by means of a pair of corresponding first openings formed therein. The first drive mechanism can comprise a stepper motor mounted at one end of the track, with a lead screw thereof extending along the track parallel with the rods. The shuttle carriage can then comprise a second opening formed therein through which the lead screw can extend, and the shuttle carriage can comprise a travelling nut mounted to the lead screw. As such, a simple rotational movement is used to move the delivery head back and forth along the track. Robust and accurate stepper motors are available which can be used to reliably move the delivery head in this way.

Preferably the manifold can comprise a base comprising a back wall, a shelf normal to the back wall, and a pair of spaced apart supports normal to the back wall and the shelf. The fluid outlets can then be provided in the shelf, and the track can be provided between the supports such that the delivery head travels over the shelf to access the fluid outlets. This construction allows the manifold to be mounted on a wall with the fluid outlets extending from its underside.

The fluid inlet to the manifold can be located on a rear side of the back wall, and a spout can extend from a front side of the back wall, with a fluid inlet path extending from the fluid inlet to an outer end of the spout. The fluid line can comprise a resilient tube, a first end of which can be mounted to the spout and a second end of which can be mounted to the arm portion.

Preferably the spout can be located on the back wall in a plane which dissects the line substantially half way along the length of the line. In other words the spout is located at a mid-point of the line, and as such the fluid line need only be long enough h the arm from that mid-point to each end of the line of fluid outlets.

A plurality of tail sections can extend from an underside of the shelf, and the manifold can comprises a plurality of fluid outlet paths, each one extending from one of the plurality of fluid outlets to an outer end of one of the tail sections. The tail sections can comprise annular formations for retaining outlet lines with which the manifold is used, which extend to the various washing machines with which the manifold will be used.

Each of the fluid outlet paths can comprise an annular seal member on an inner surface thereof, which can be spaced a shorter distance from the corresponding fluid outlet than the distance the probe portion extends from the lower surface. As such the annular seal member can form a fluid seal against the probe portion when the probe portion is in the advanced position. This prevents leakage of fluid in use.

In a preferred construction the shelf can comprise a plurality of mounting slots, and an outlet connector can be removably mounted in each of the slots. Each outlet connector can comprises one of the fluid outlets at an upper end thereof and one of the tail sections, and can define one of the fluid outlet paths therethrough. With this construction the outlet connectors can be readily switched out if they need to be replaced, and it also allows for the tail sections to be more readily mounted in the outlet lines while the outlet connectors are disconnected, before they are then slotted back in place. Further, it also allows for the outlet lines to be moved to different positions on the manifold if necessary.

It is important to ascertain the position of the delivery head and the connector member in order to ensure the correct functioning of the system. Therefore, the shuttle carriage can comprise a first position sensor on the front side and the connector member can comprise a protrusion on a rear side thereof which interacts with the first position sensor to determine the position of the connector member on the guide.

Further, the manifold can comprise a second position sensor at a first end of the track, and the delivery head can comprise a surface which can interact with the second position sensor when the delivery head is positioned at the first end of the track. This allows the delivery head to confirm its exact position from time to time.

The base can comprise a delivery compartment housing the track, first drive mechanism, delivery head and fluid outlets. It can then comprise a control compartment housing the control module, and control cables can pass from the control module to the first drive mechanism and to the delivery head. The control module can be in the form of a PCB with all the components required to carry out the functionality of the invention, such as a power supply, a programmable micro-controller, a database and an I/O to receive and send signals. As the construction of such a PCB will be within the abilities of the skilled person it will not be further described herein in any great detail. It is simply necessary that the PCB be configured to carry out the functions explained below.

Preferably control cables can pass from the control module to the delivery head via a control cable aperture provided in the back wall adjacent to the spout. As such, the aperture is also located at a mid-point of the line, and as such the control cables need only be long enough to reach the delivery head from that mid-point to each end of the line of fluid outlets. The control cables can be attached to a socket on the top of the shuttle carriage.

It will be appreciated that the manifold of the first aspect of the present invention can be sold as a standalone unit, however it is just as likely to be supplied as a part of an entire fluid delivery apparatus. Therefore, according to a second aspect of the present invention fluid delivery apparatus comprises a main dosing unit, a plurality of pumps, a water dilution station, and a manifold, in which each of said pumps is for pumping chemical washing fluid from a drum of chemical washing fluid with which said apparatus is used to said water dilution station, in which said water dilution station is configured to dilute said chemical washing fluid with water to form a dilution fluid and to direct it to said manifold, in which said manifold is for selectively directing said dilution fluid to one of a plurality of washing machines with which said apparatus is used, in which said main dosing unit is configured to send first operation signals to each of said pumps to pump chemical washing fluid from said drums to which they are connected to said water dilution station, in which said main dosing unit is configured to send second operation signals to said manifold to selectively direct said dilution fluid to one of said plurality of washing machines. The manifold is in accordance with the first aspect of the invention, and so comprises a fluid inlet, a plurality of fluid outlets, a movable conduit member, a first drive mechanism and a control module, in which said conduit member comprises a fluid path therethrough, in which said fluid inlet is fluidly connected to a first end of said fluid path, in which said conduit member is mounted for movement on a support member, and in which said first drive mechanism is configured to move said conduit member on said support member to selectively associate a second end of said fluid path with one of said plurality of fluid outlets according to commands issued by said control module.

The present invention can be performed in various ways but one embodiment will now be described by way of example and with reference to the accompanying drawings, in which.

As shown in the Figures a manifold 1 comprises a fluid inlet 2, a plurality of fluid outlets 3, a conduit member, in the form of delivery head 4, a first drive mechanism, in the form of stepper motor 5, and a control module, in the form of PCB 6. The delivery head 4 comprises a fluid path 7 therethrough, and a fluid line 8 extends from the fluid inlet 2 to a first end 9 of the fluid path 7. The delivery head 4 is mounted for movement on a support member, in the form of track 10, and the stepper motor 5 is configured to move the delivery head 4 on the track 10 to selectively associate a second end of 11 the fluid path 7 with one of the plurality of fluid outlets 3 according to commands issued by the PCB 6.

The manifold 1 comprises a base 12 comprising a back wall 13, a shelf 14 normal to the back wall 13, and a pair of spaced apart supports 15 and 16 normal to the back wall 13 and the shelf 14. The supports 15 and 16 are rectangular blocks which are fixed to the back wall 13 with blots. The seven fluid outlets 3 are provided in the shelf 14, arranged in a straight line A-A. The track 10 is parallel to the line A-A and extends between the supports 15 and 16. The delivery head 4 is mounted on the track 10 such that it travels over the shelf 14 to access the different fluid outlets 3. As explained further below, a portion of the fluid path 7 which terminates at the second end 11 thereof is normal to the line A-A, such that it can be axially aligned with each of the seven fluid outlets 3.

The track 10 comprises a pair of parallel rods 17 supported between the supports 15 and 16, and the delivery head 4 comprises a shuttle carriage 18 mounted for reciprocal movement on the track 10 by means of a pair of corresponding first openings 19 formed therein. The first drive mechanism 5 comprises an electrical stepper motor of a known kind which is mounted to an outer side 20 of support 15. A lead screw 21 of the stepper motor 5 passes through the support 15, and runs between the rods 17 to the support 16, where an outer end 22 thereof is supported by a bearing 23. The shuttle carriage 18 comprises a second opening 24 formed therein through which the lead screw 21 extends. A travelling nut 25 is mounted to the side 26 of the shuttle carriage 18, and is threaded onto the lead screw 21.

As such, the rotational movement of the lead screw 21 moves the delivery head 4 back and forth along the track 10.

Figure 3:
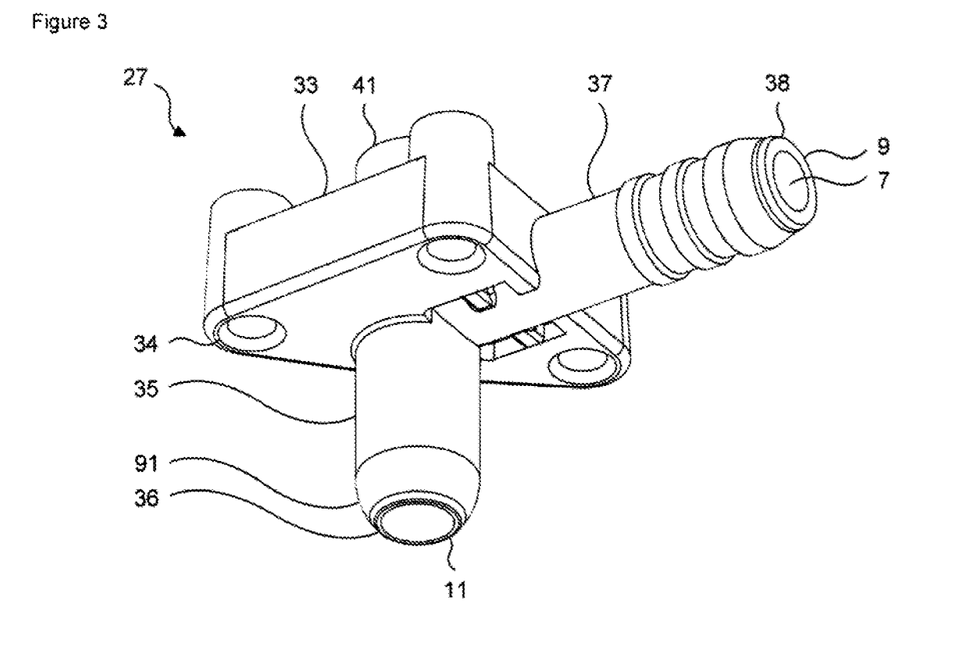
FIG. 3 is a perspective view of a connector member part of the manifold shown in FIG. 1.

The delivery head 4 also comprises a connector member 27, which is mounted on guide 28 provided at a front 29 of the shuttle carriage 18. An upper plate 30 and a lower plate 31 are mounted to the shuttle carriage 18, and extend proud of the front 29 thereof. The guide 28 comprises three guide shafts 32 mounted between the upper plate 30 and the lower plate 31, which are arranged in an isosceles triangle configuration with a hypotenuses side thereof parallel with the front 29 of the shuttle carriage 18. Referring to FIG. 3, the connector member 27 comprises a body portion 33 which has a corresponding isosceles triangle shape with an aperture 34 at each corner thereof, through each of which a guide shaft 32 passes, such that the body portion 33 can slide up and down the guide 28.

The connector member 27 comprises the fluid path 7 therethrough. It has a downwardly depending probe portion 35 which is parallel with the guide shafts 32 and has the second end of the fluid path 11 at an outer end 36 thereof. The connector member 27 further comprises an arm portion 37 which is normal to the probe portion 35 and has the first end 9 of the fluid path 7 at an outer end 38 thereof. As is visible in the figures the arm portion 37 extends from a congruent side of the isosceles triangle shaped body portion 33 at a normal angle thereto. The fluid line 8 is mounted to the arm portion 37 in order to be fluidly connected to the first end 9 of the fluid path 7. Therefore, the fluid path 7 through the connector member 27 is generally L-shaped, which a first section extending through the arm portion 35, and a second section orthogonal to the first extending through the probe portion 35. Further, as is clear from FIGS. 1 and 2, the first end 9 of the fluid path 7 is positioned away from the guide shafts 32 which allows for the fluid line 8 to move freely up and down with the arm portion 37, as well as back and forth with the delivery head 4 as a whole, as explained further below.

Figure 1:
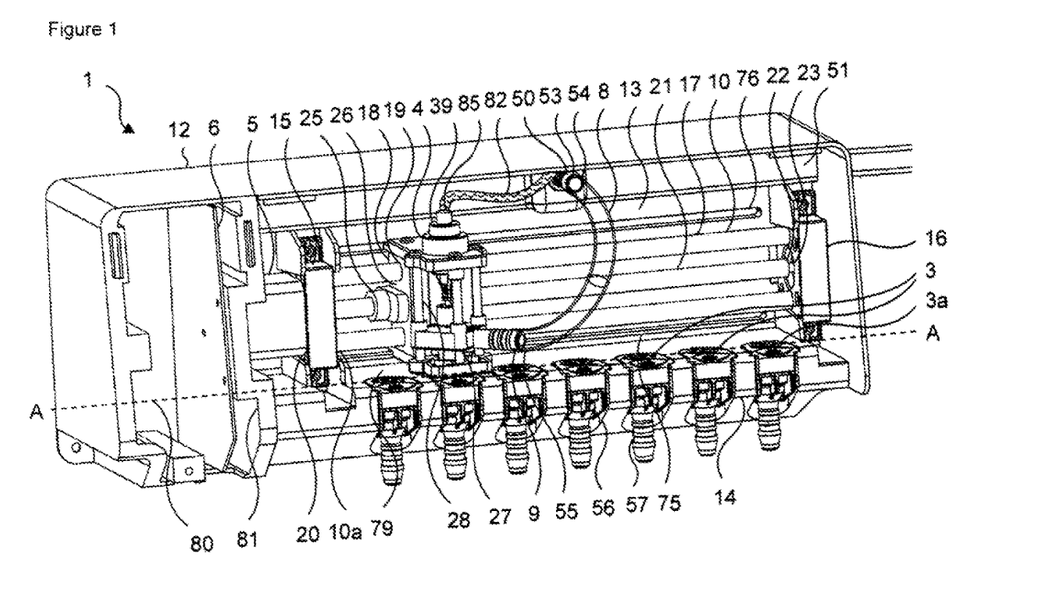
FIG. 1 is a perspective view of a manifold according to the first aspect present invention with a cover component thereof removed.
Figure 2:
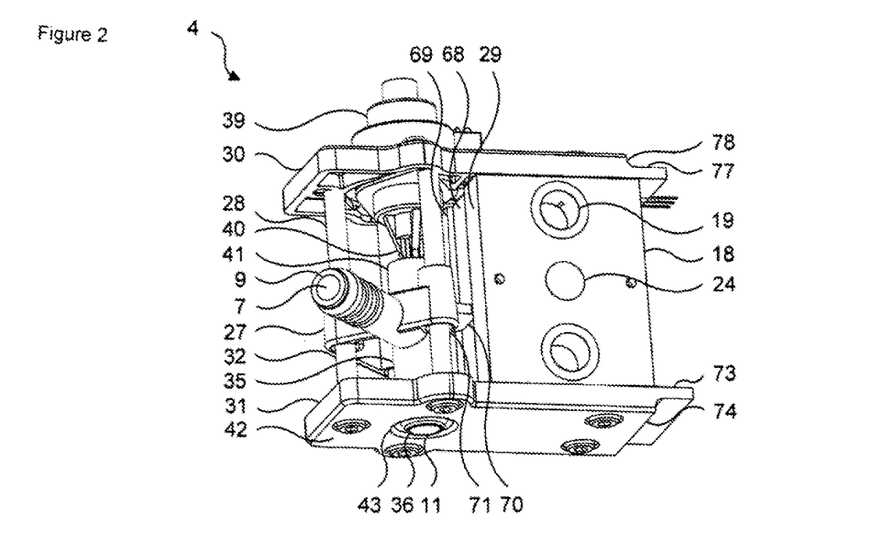
FIG. 2 is a perspective view of a delivery head part of the manifold shown in FIG. 1.

A second drive mechanism, in the form of linear motor 39, is mounted to the upper plate 30 above the guide 28. A linear shaft 40 of the linear motor 39 extends down into the guide 28 parallel with the guide shafts 32. The body portion 33 comprises a socket 41 in which the linear shaft 40 is mounted, so its movement is transmitted directly to the connector member 27. As explained further below, the linear motor 39 is configured to move the connector member 27 on the guide 28 between a retracted position as shown in FIG. 2, and an advanced position as shown in FIG. 1, in the retracted position the outer end 36 of the probe portion 35 is level with a lower surface 42 of the lower plate 31. The lower plate 31 comprises an aperture 43 through which the probe portion 35 passes, and in the retracted position the outer end 36 of the probe portion 35 is disposed in the aperture 43. In this position the delivery head 4 can move freely on the track 10 between the fluid outlets 3 because the probe portion 35 is not proud thereof. In the advanced position the probe portion 35 is proud of the lower surface 42 and can extend through one of the fluid outlets 3. This is the configuration illustrated in FIG. 1. Therefore, the stepper motor 5 can move the delivery head 4 back and forth on the track 10 between the fluid outlets 3 when the connector member 27 is in the retracted position, and when the delivery head 4 is positioned over one of the fluid outlets 3 the linear motor 39 can advance the connector member 27 so the probe portion 35 moves down through the fluid outlet 3 in order for fluid to be delivered correctly.

Figure 5:
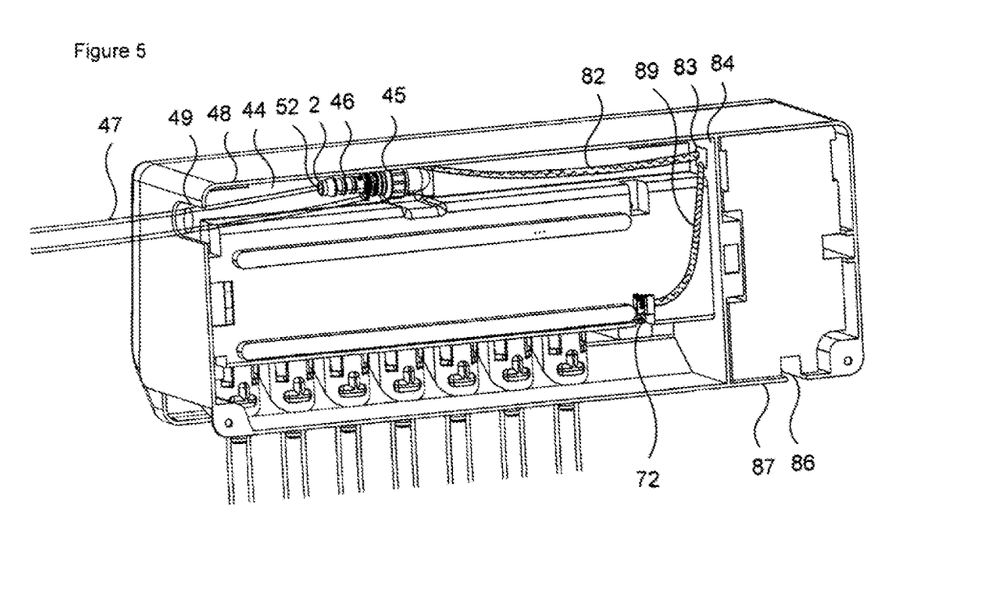
FIG. 5 is a rear perspective view of the manifold shown in FIG. 1.

As shown in FIG. 5 the fluid inlet 2 is located on a rear side 44 of the back wall 13. It is provided at the end of a tube 45 which faces to one side of the manifold 1. The tube 45 comprises a tail section 46 to which an inlet line 47 can be connected. With this arrangement the inlet line 47 can be run along a wall on which the manifold is mounted. A rear skirt section 48 is provided proud of the rear side 44 of the back wall 13 to shield the fluid inlet 2. An indent 49 is provided for the inlet line 47 to pass through.

As shown in FIG. 1, a spout 50 extends from a front side 51 of the back wall 13. A fluid inlet path 52 extends from the fluid inlet 2 to an outer end 53 of the spout 50. The fluid line 8 comprises a resilient tube, a first end 54 of which is mounted to the spout 50, and a second end 55 of which is mounted to the arm portion 37.

As is clear from FIG. 1, the spout 50 is located on the back wall 13 in a plane which dissects the line A-A substantially half way along the length of the fluid outlets 3 on the line A-A. In other words the spout 50 is located at a mid-point of the line A-A, adjacent to the centre fluid outlet of the seven fluid outlets 3 provided, and as such the fluid line 8 need only be long enough to reach the arm portion 37 from that mid-point to each end of the line A-A of fluid outlets 3. Enough slack is provided in the fluid line 8 to allow free movement of the delivery head 4 along the track 10, and free movement of the connector member 27 alone the guide 28.

Figure 4:
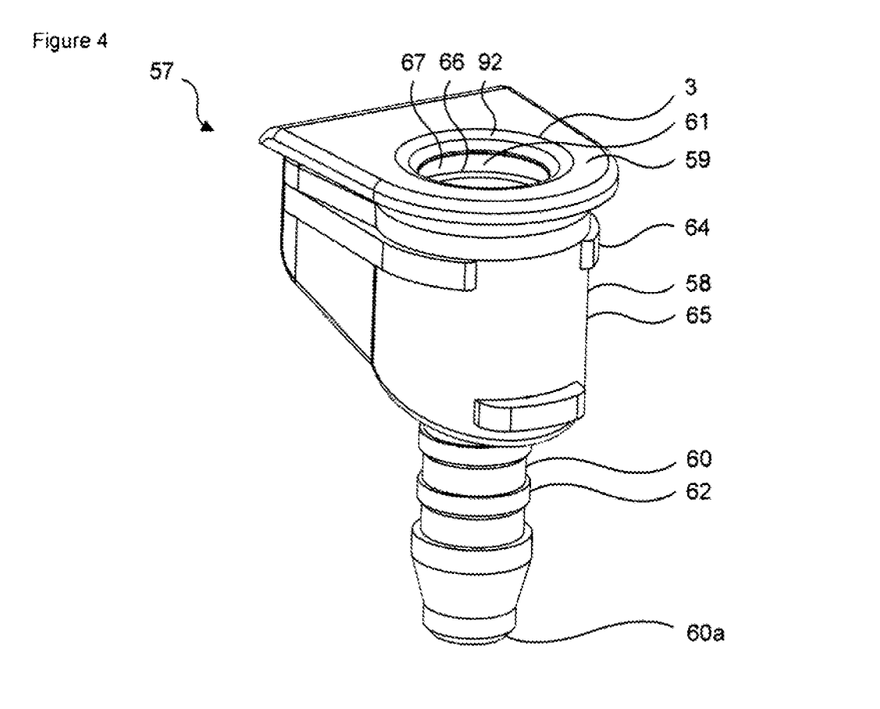
FIG. 4 is a perspective view of an outlet connector part of the manifold shown in FIG. 1.

The shelf 14 comprise a plurality of mounting slots 56, in each of which an outlet connector 57 is removably mounted. Referring to FIG. 4, each outlet connector 56 comprises a body portion 58 which defines one of the fluid outlets 3 at an upper end 59 thereof, a tail section 60. A fluid outlet path 61 passes through the outlet connector 56 from the fluid outlet 3 to an outer end 60a of the tail section 60. Each tail section 60 comprises annular formations 62 for retaining an outlet line 63 (shown in FIGS. 5 and 6), which extend to washing machines with which the manifold 1 will be used, as explained further below.

The outlet connectors 57 are a snap-fit in mounting slots 56, and they comprise formations 64 on an external surface 65 thereof to facilitate this connection. With this construction the outlet connectors 57 can be readily switched out if they need to be replaced, and it also allows for the tail sections 60 to be more readily mounted in the outlet lines 63 while the outlet connectors 57 are disconnected, before they are then slotted back in place. Further, it also allows for the outlet lines 63 to be moved to different positions on the manifold 1 if necessary, without being disconnected from a tail section 60.

The fluid outlet path 61 of each outlet connector 57 comprises an annular blade seal 66 on an inner surface 67 of the fluid outlet path 61, which is spaced a shorter distance from the fluid outlet 3 than the distance the probe portion 35 extends from the lower surface 42. As such the annular blade seal 66 forms a fluid seal against the probe portion 35 when the probe portion 35 is in the advanced position and located in the fluid outlet path 61. This prevents leakage of fluid in use.

Further, the fluid outlet path 61 of each outlet connector 57 also comprises a one-way umbrella value therein (not visible), which prevents any back fluid from leaking out from the fluid outlets 3 in use.

It is important to ascertain the position of the delivery head 4 and the connector member 27 in order to ensure the correct functioning of the system. Referring to FIG. 2, the shuttle carriage 18 comprises a first position sensor in the form of pressure sensor strip 68, which is located in a slot 69 on the front side 29, and the connector member 27 comprises a protrusion 70 on a rear side 71 thereof which rides over the pressure sensor strip 68, so it can detect the position of the connector member 27 on the guide 28.

Referring to FIG. 5, the manifold 1 comprises a second position sensor in the form of pressure sensor 72, which is located on the rear side 44 of the back wall 13, adjacent a first end 10a of the track 10. The delivery head 4 comprise an interface surface, in the form of lip 73 at a rear side 74 of the lower plate 31, which contacts the pressure sensor 72 when the delivery head 4 is positioned at the first end 10a of the track 10. This allows the delivery head 4 to confirm its exact position from time to time. A lower elongate trough 75 is formed in the back wall 13, in which the lip 73 travels when the delivery head 10 moves back and forth on the track 10. An upper elongate trough 76 is also formed in the back wall 13, in which a lip 77 at a rear side 78 of the upper plate 30 travels when the delivery head 4 moves. This arrangement also provides an additional level of support for the delivery head 4 in use.

Referring back to FIG. 1, the base 12 comprises a delivery compartment 79 housing the track 10, stepper motor 5, delivery head 4 and fluid outlets 3. It also comprises a control compartment 80 housing the PCB 6. (The PCB 6 is shown as just a substrate for illustrative purposes, and in practice it would host all the necessary electronic components required to carry out the functionality of the invention, such as a power supply, a programmable micro-controller, a database and an I/O to receive and send signals.) Control cables pass from the PCB 6 to the stepper motor 5 and to the delivery head 4. Namely, first control cables (not visible) pass from the PCB 6 to the stepper motor 5 through chamber dividing wall 81, so the PCB 6 can drive the stepper motor 5 to control the position of the delivery head 4 on the track 10. They also allow for data to be sent back to the PCB 6, such as performance or fault data gathered from the stepper motor 5.

Second control cables 82 pass from the PCB 6 to the delivery head 4 firstly through an aperture 83 in a rear section 84 of the chamber dividing wall 82, and then through a further aperture (not visible) provided in the back wall 13 just above the spout 50. As is clear from FIG. 1, the further aperture (not visible) is also located at a mid-point of the line A-A, and as such the second control cables 82 need only be long enough within the delivery compartment 79 to reach the delivery head 4 from that mid-point to each end of the line A-A of fluid outlets 3. Enough slack is provided in the second control cables 82 to allow free movement of the delivery head 4 along the track 10. The second control cables 82 are attached to a socket 85 on the upper plate 30 adjacent to the linear motor 39. The second control cables 82 allow the PCB 6 to drive the linear motor 39 to control the position of the connector member 27 on the guide 28. They also allow for data to be sent back to the PCB 6, such as position data from the pressure sensor 72, or other performance or fault data gathered from the linear motor 39. Both the first control cables and the second control cables 82 provide both communications and power lines to provide for the full functionality of the manifold 1 as set out herein. Any of the known communications protocols can be used in order to facilitate two-way communication between the parts. Referring to FIG. 5, the control compartment 80 comprises an opening 86 in its lower side 87, to allow for power and communication lines 88 (shown in FIG. 6) to be connected to the PCB 6. Third control cables 89 pass from the pressure sensor 72 to the PCB 6 through the aperture 83, so data gathered by the pressure sensor 72 can be communicated to the PCB 6.

Figure 6:
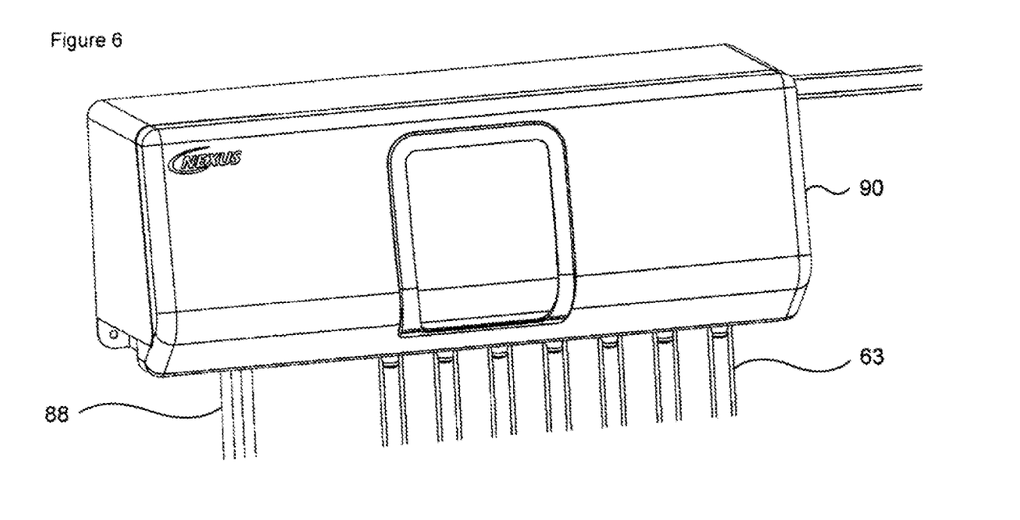
FIG. 6 is a perspective view of the manifold shown in FIG. 1.

The manifold 1 is provided with a removable cover 90 as shown in FIG. 6, in order to protect the various componentry in the delivery compartment 79 and the control compartment 80 in use, and to provide the manifold 1 with an ergonomic appearance.

In use the manifold 1 operates as follows. The manifold 1 forms a part of a fluid delivery apparatus 100, as shown in diagrammatic form in FIG. 7. The apparatus 100 comprises a main dosing unit 101, which contains a main control PCB 101a which performs the controlling operations described below, and four pumps 102. The apparatus 100 further comprises a water dilution station, in the form of dilution manifold 103, and manifold 1. Each of the four pumps 102 of the main dosing unit 101 is connected to one of four drums of chemical washing fluid 104 by a pump inlet line 105, and can pump the washing fluid in question to one of four inlets 106 of the dilution manifold 103, via a pump outlet line 107. In normal operation the pump inlet line 105 and the pump outlet line 107 are flooded with the chemical washing fluid, so as soon as the pump 102 starts to operate chemical washing fluid will end the dilution manifold 103. The inlets 106 comprise non-return valves 106a to prevent any fluid passing from the dilution manifold 103 back down the pump outlet lines 107. The non-return valves 106a are also biased by a spring loading into a shut position to prevent leakage from any of the pump outlet lines 107 into the dilution manifold 103.

Figure 7:
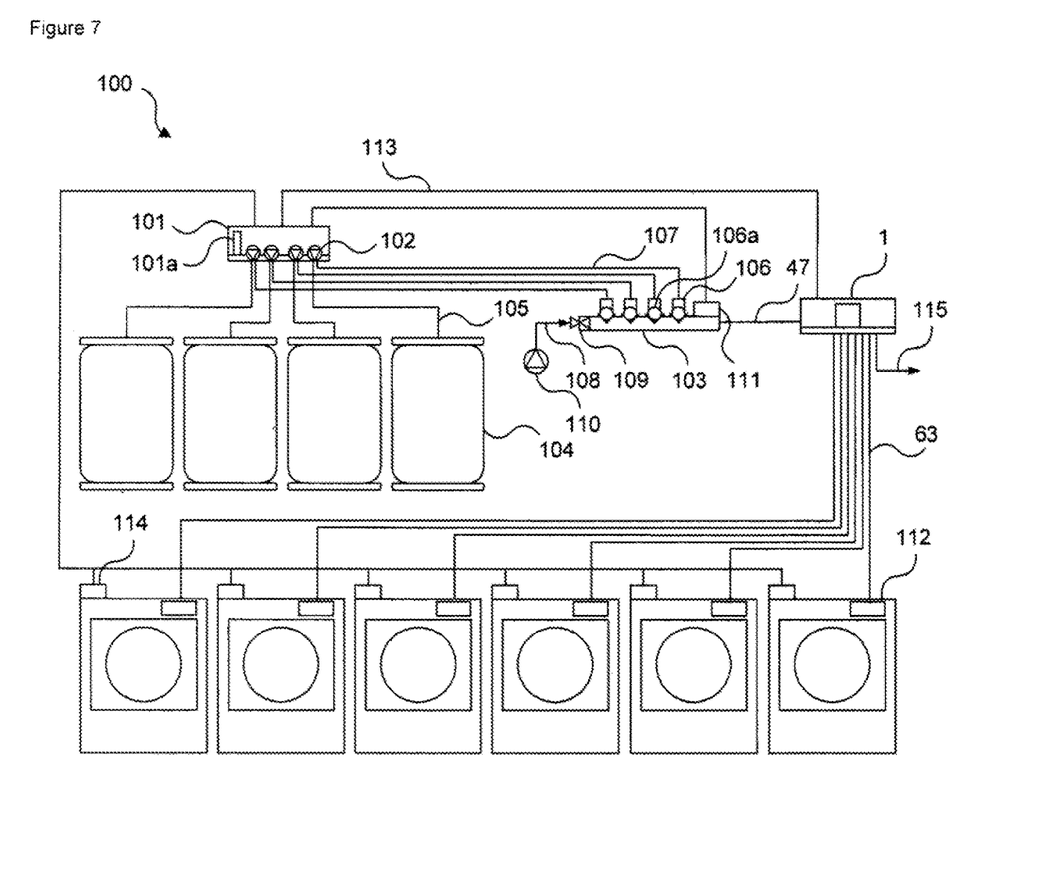
FIG. 7 is a diagrammatic view of a fluid delivery apparatus according to the second aspect of the present invention.

The dilution manifold 103 is provided with a water supply 108 at a solenoid valve controlled water inlet 109 thereof. The water supply is commonly from a mains supply or a reservoir. An optional booster pump 110 can be provided if the mains water pressure on site is insufficient to drive the water through the apparatus 111 as necessary. The dilution manifold 103 comprises a control unit 111 configured to control the open/closed state of the water inlet 109 by operating the solenoid valve. In this way incoming chemical washing fluid is diluted with the water to form a dilution fluid, which is then directed from the dilution manifold 103 to the manifold 1 via inlet line 47. The manifold 1 is as described above, and can selectively direct the dilution fluid to one of six industrial washing machines 112, via the respective outlet line 63.

The main control PCB 101a controls the operation of the apparatus 100 according to its programming. For this purpose it is connected via communications lines 113 to the dilution manifold 103, the manifold 1 and each of the washing machines 112. It is connected to the pumps 102 by wiring internal to the main dosing unit 101. As explained further below, the main control PCB 101a is configured to send first operation signals to the pumps 102 to pump the chemical washing fluid in question from its drum 104 to the dilution manifold 103. The main control PCB 101a is also configured to send second operation signals to the manifold 1 to selectively direct the dilution fluid in question to a particular one of the washing machines 112 which requested it. Furthermore, the main control PCB 101a is also configured to send third operation signals to the dilution manifold 103 to adopt the correct open/closed state of the water inlet 109 so the incoming chemical washing fluid is diluted with water and then directed to the manifold 1 for further selective directing. The manifold 1 comprises seven fluid outlets 3, with each of the first six connected to one of the washing machines 112, and the final one 3a directed to a drain 115, for the purpose of allowing the dilution manifold 103 and the inlet line 47 to be flushed with water as necessary.

Each of the washing machines 112 is provided with an I/O interface 114 which forms part of the apparatus 100. These I/O interfaces 114 allow for the washing machines 112 to make requests for washing chemicals to the main dosing 101 unit via the communication lines 113, as well as to report performance data and faults.

All parts of the apparatus 1 are known except for the manifold 1, the place of which is taken in known examples by a solenoid valve controlled manifold of the conventional static type.

When one of the washing machines 112 is used it is loaded with items to be washed and a particular wash program is selected by the user. In this case this is actually done via the I/O interface 114, which features a control interface (not shown). The washing machine 112 in question then carries out the selected wash program, which involves the use of one or more particular doses of chemical washing fluids at certain intervals. When such a dose is required a requisite demand signal is sent from the I/O interface 114 to the main dosing unit 101.

The main control PCB 101a comprises a database containing data pertaining to the particular arrangement of the parts of the apparatus 100, and in particular which chemical is in which drum 104, which pumps they are connected to, which chemical inlets 106 of the dilution manifold 103 each of the pumps 102 are connected to, and which fluid outlets 3 are connected to which washing machines 112. The database also comprises data on the pumping performance of each pump 102, and in particular the run time required to deliver particular volumes of chemical washing fluid. (Alternatively, or in addition to this, flow sensors, not shown, can be used to determine the volumes being pumped.)

The incoming demand signal comprises data pertaining to the identity of the washing machine 112 which sent it, which chemical washing fluid is required, and how much. The main control PCB 101a comprises a processor which processes the demand signal and produces the requisite first, second and third operation signals which when carried out will meet the demand made by the washing machine 112. The main control PCB 101a then issues those first, second and third operation signals as follows. The first operation signal is sent to the pump 102 connected to the drum 104 containing the required chemical washing fluid, to run for a set run time which equates to the quantity of the chemical washing fluid required. When the pump 102 in question runs, the chemical washing fluid in the respective pump outlet line 107 is driven immediately into the dilution manifold 103, over the respective non-return valve 106a. As described below, when it does this it is diluted with water passing through the dilution manifold 103. The other non-return valves 106a prevent any of the chemical washing fluid, water or dilution fluid from entering the other pump outlet lines 107.

The third operation signal instructs the control unit 111 to control the water flow through the dilution manifold 103 as requited. If there is no booster pump present then this involves switching the solenoid of the water inlet 109 to an open state for a period of time which equates to the correct quantity of water entering the apparatus 100 to form the requisite dilution fluid with the chemical washing fluid entering the dilution manifold 103. If there is a booster pump 110 present then this involves switching the solenoid of the water inlet 109 to an open state and running the booster pump 110 for a set run time which equates to the quantity of water required to form the requisite dilution fluid.

The second operation signal is sent to the manifold 1 to create a fluid path for the dilution fluid to be directed to the washing machine 112 in question, as explained in more detail below.

It will be appreciated that for the apparatus 100 to operate correctly it is necessary for the components thereof to harmonize the timing of their particular actions. In particular the chemical washing fluid and the water must enter the dilution manifold 103 at the correct times, and the manifold 1 must have assumed the correct configuration before the dilution fluid arrives from the dilution manifold 3. The main control PCB 101a can be programmed to run the pump 102 and open the water inlet 109 simultaneously. However, in an advantageous arrangement the main control PCB 101a is programmed such that the first operation signal and/or the third operation signal are configured so the control unit 111 opens the water inlet 109 a period time before the pump 102 is run, and then only closes the water inlet 109 a period of time after the pump 102 is run. These periods of time can be 2 seconds. This results in the body of dilution fluid comprising a quantity of water preceding and following a quantity of water diluted with the chemical washing fluid. This serves to separate the different chemical washing fluids from one another in use, as there is a barrier of water between them. The chemical washing fluids which are commonly used are potentially dangerous if mixed. It also means the inlet line 47 and the manifold 1 are flushed with water between deliveries, which prevents chemical washing fluid from remaining therein. It makes no difference to the washing machine 112 that the dilution fluid arrives in this state, because the total volume of water is fully diluted with the total volume of chemical washing fluid inside the washing machine 112.

The second operation signal can be issued at the same time as the third operation signal, and if so the manifold 1 should have time to assume the correct position, as it will only take a few seconds or less for this to happen. However, this will be a matter for the installation engineer setting up the apparatus 100 to deal with. In particular, in most cases the pump outlet is line 105 and the inlet line 47 will usually be fairly short in length, but still sufficiently long to accommodate the actions of the dilution manifold 103 and manifold 1 in time. The pumping speed of the pumps 102 is also a factor which is taken into account. In the event that a particular installation requires it the second and/or third operation signals can comprise data which pertains to particular points in time when the operations in question are to be performed. Alternatively, or in addition to this, the apparatus 100 can be set-up so the first operation signal will only be issued, or actioned, once confirmation signals have been received from the dilution manifold 103 and/or the manifold 1 that the third and/or second operation signals have been acted upon. Programmed co-ordination of this nature is generally known from existing installations of this kind and is therefore not described herein in any greater detail.

In any event, upon receipt of the second operation signal the components of the PCB 6 process the incoming data and produce run commands for the stepper motor 5 and the linear motor 39 which will drive the delivery head 4 to the correct position on the track 10 to access the fluid outlet 3 in question, and which will lower the connector member 27 on the guide 28 to insert the probe portion 35 into the fluid outlet path 61 at the appropriate time. The run command for the stepper motor 5 is calculated based on the known last position of the delivery head 4 on the track 10, and therefore the movement either left or right which the delivery head 4 needs to make to achieve the correct position on the track 10 to access the fluid outlet 3 in question. This could also be a command to remain stationary if the delivery head 4 is already in the correct position. The known last position of the delivery head 4 is taken from the previous run command issued by the PCB 6, and/or from data provided by pressure sensor 72, which indicates the position of the delivery head 4 at the first end 10a of the track 10. If the location of the delivery head 4 is not known (for example when the manifold 1 is first operated, or after a power cut) the stepper motor 5 can first rotate the lead screw 21 in order to drive the delivery head 4 on the track 10 until it reaches the first end 10a thereof and the lip 73 contacts the pressure sensor 72. The PCB 6 then knows the location of the delivery head 4 and the next run command it creates can be calculated based on the delivery head 4 being at the first end 10a of the track 10.

The run command for the stepper motor 5 is sent thereto via the first control cables (not visible) which pass between the PCB 6 and the stepper motor 5 through chamber dividing wall 81. The run command for the stepper motor 5 comprises a rotational direction for the lead screw 21 to rotate, which will determine the direction the delivery head 4 will travel, and a run time or step number which will determine the distance the delivery head 4 will travel. The run time or step number is based on design data contained in a database of the PCB 6 which is derived firstly from the characteristics of the stepper motor 5, such as the degree of rotation of each step, or portion of rotation of each step, and therefore the physical distance the delivery head 4 will travel each time, and secondly from the physical distance between each fluid outlet 3. For example, it may require 100 steps to move the delivery head 4 between positions in which it is co-axial with each fluid outlet 3, and therefore the command signal will be based on such data, and would for example comprise 300 steps to move the delivery head 4 from its known position over one fluid outlet 3 to another two along therefrom.

Upon receipt of the run command in question the stepper motor 5 carries out the necessary action. It rotates the lead screw 21 in the instructed direction, for the instructed number of steps. The rotation of the lead screw 21 acts upon the travelling nut 25, and the shuttle carriage 18 moves left or right the appropriate distance on the track 10. In particular, the openings 19 pass over the rods 17, while the lips 73 and 77 travel through the lower elongate trough 75 and the upper elongate trough 76 respectively. These support structures ensure that the shuttle carriage 18 moves laterally over the shelf 14 without any rotational or twisting movement. The stepper motor 5 only carries out this action when the connector member 27 is in the retracted position (as explained further below), and as such the outer end 36 of the probe portion 35 is located in the aperture 43 in the lower plate 31, clear of the shelf 14. When the lead screw 21 stops rotating the shuttle carriage 18 should be positioned directly over the fluid outlet 3 which is connected to the outlet line 63 connected to the washing machine 112 in question. Once the run command has been performed in this way the stepper motor 5 sends a confirmation signal to the PCB 6 that the delivery head 4 is now in the correct position.

The run commands for the linear motor 39 are calculated based on the last known position of the connector member 27 on the guide 28, and therefore whether it needs to be first raised into the retracted position prior to the movement of the delivery head 4, or simply lowered into the advanced position after movement of the delivery head 4. The last known position of the its connector member 27 is taken from the previous run command issued by the PCB 6, and/or from data provided by the pressure sensor 68, which indicates the advanced/retracted position of the connector member 27.

It will be appreciated that for the manifold 1 to operate correctly it is necessary for the components thereof to harmonize the timing of their particular actions. In particular, if the connector member 27 is in the advanced position the linear motor 39 must act on its run command to raise the connector member 27 before the stepper motor 6 acts on its run command to move the delivery head 4. Likewise, the linear motor 39 must only act on a run command to lower the connector member 27 when the delivery head 4 is in the correct position on the track 10. The PCB 6 is therefore configured to take the known positions of the connector member 27 and the delivery head 4 into account when issuing the run commands, for example by issuing them at appropriate intervals, or issuing them with data pertaining to points in time when the actions should be performed. Alternatively, or in addition to this, the manifold 1 can be set-up so the run commands will only be issued, or actioned, once confirmation signals have been received from the stepper motor 5 and/or the pressure sensor strip 68 that necessary prior actions have been completed, such as the movement of the delivery head 4 into position, or the raising of the connector member 27. Programmed co-ordination of this nature is a matter for the skilled person setting up the operational parameters of the manifold 1. How this is done using computer programming will be within the common general skills of the skilled person and will not be described herein in any greater detail. All that is relevant is that the manifold 1 operates to achieve the physical functions described herein in the correct order.

The run commands for the linear motor 39 are sent thereto via the second control cables 82 which pass from the PCB 6 to the delivery head 4 through aperture 83 and then through the further aperture (not visible) provided in the back wall 13. The run commands for the linear motor 39 comprises a run time or other binary command for the linear motor 39 to operate to raise or lower the linear shaft 40, and hence raise or lower the connector member 27 on the guide 28. If it is a command for the linear motor 39 to lower the linear shaft 40 it does so until the connector member 27 reaches the lower plate 31 and the probe portion 35 is fully inserted into the fluid outlet path 61 of the outlet connector 57 in question. If it is a command for the linear motor 39 to raise the linear shaft 40 it does so until the connector member 27 reaches the retracted position, as shown in FIG. 2.

Upon receipt of the run command in question the linear motor 39 carries out the necessary action. It either raises or lowers the linear shaft 40, which acts upon the connector member 27, and it moves up or down on the guide 28. In terms of satisfying the demand from the washing machine 112 in question, if the connector member 27 is located in a fluid outlet 3 which is not connected to the washing machine 112 in question, the PCB 6 will issue a first run command for the connector member 27 to be raised to the retracted position in order for the delivery head 4 to be moved on the track 10 to the correct fluid outlet 3. Whether such a first run command was necessary or not, once the PCB 6 is in receipt of the confirmation signal from the stepper motor 5 that the delivery head 4 is over the correct fluid outlet 3 (or if the PCB 6 is aware that the delivery head 4 was already in such a location), the PCB 6 will issue a second run command for the connector member 27 to be lowered into the advanced position.

When the connector member 27 moves up or down the apertures 34 pass over the guide shafts 32, which ensures that the connector member 27 moves vertically without any rotational or twisting movement. Furthermore, the protrusion 70 rides over the pressure sensor strip 68 which determines the location of the connector member 27, and in particular whether it is in the fully advanced or fully retracted state. If the run command involves raising the connector member 27, then once this has occurred a signal is sent to the PCB 6 from the pressure sensor strip 68, to indicate that the connector member 27 is in the fully retracted position, and the delivery head 4 can be moved. Alternatively, if the run command involves lowering the connector member 27, then once this has occurred a signal is also sent to the PCB 6 from the pressure sensor strip 68, to indicate that the connector member 27 is in the fully advanced position.

When the connector member 27 is lowered into the advanced position the probe portion 35 enters the fluid outlet 3 in question. In particular it enters the fluid outlet path 61 and as it passes over the annular blade seal 66 it forms a fluid seal with the outlet connector 57.

The manifold 1 is now configured to direct the dilution fluid to the washing machine 112 which requested it.

When the dilution fluid reaches the manifold 1 enters the fluid inlet 2, passes through the fluid inlet path 52, exits the outer end 53 of the spout 50 and enters the fluid line 8. It then passes down the fluid line 8 and enters the first end 9 of the fluid path 7. The dilution fluid then travels along the fluid path 7 through the connector member 27, and exits the second end 11 of the fluid path 7 at the outer end 36 of the probe portion 35. As this is located inside the fluid outlet path 61 the dilution fluid enters the fluid outlet path 61, passes over the non-return umbrella valve therein and passes into the outlet line 63 in question, which leads to the relevant washing machine 112.

The PCB 6 can also be configured to issue run commands to the stepper motor 5 and/or linear motor 39 which return the delivery head 4 and/or the connector member 27 to neutral positions after the dilution fluid has passed through the manifold 1. The connector member 27 can be raised, and the delivery head 4 can be moved to either end of the track 10, or to a centre position thereon, after a given period of time has elapsed, which is calculated on the time it takes the dilution fluid to pass through the manifold 1. Alternatively, the PCB 6 can be configured to issue run commands which simply place the delivery head 4 and the connector member 27 in specific delivery positions, and just leave them there until another second operation signal is received.

It is possible for the location of the delivery head 4 to deviate from that intended, as a result of external influences, or slight deviations in performance of the stepper motor 5. The manifold 1 has two mechanism to deal with this.

Firstly, the PCB 6 is configured to issue a run command to the stepper motor 5 to return the delivery head 4 to the first end 10*a* of the track 10 where the sensor 72 is activated, each time pre-determined number of operations have been performed, for example after every 50 or 100 movements. The PCB 6 then re-sets its data on the location of the delivery head 4. This ensures that any deviation from known and actual positions never grows to such an extent that an error in operation is experienced. The PCB 6 will also always do this when first switched on, or after a power cut, in order to re-set its data on the known location of the delivery head 4.

Secondly, the outer end 36 of the probe portion 35 comprises a tapered section 91, while each outlet connector 57 comprises a tapered inlet section 92 of the fluid outlet path 61. Further, the stepper motor 5 comprises a clutch mechanism (not shown) which allows the lead screw 21 to be freely rotated when not in operation. As such, in the event that the delivery head 4 is slightly misaligned with a fluid outlet 3 into which the connector member 27 is to be lowered, such that the probe portion 35 is not co-axial with the fluid outlet path 61, when the connector member 27 is lowered by the linear motor 39 the tapered section 91 is driven into contact with the tapered inlet section 92, and the interaction of these surfaces transmits the impetus of the linear motor 39 to the shuttle carriage 18, and moves it to the left or right, rotating the lead screw 21. This action occurs until the probe portion 35 is moved into co-axial alignment with the fluid outlet path 61, and further drive from the linear motor 39 simply moves the connector member 27 into the fully advanced position.

The main control PCB 101a can be programmed such that after a particular period of time, or after specific events, the main dosing unit 101 can flush the apparatus 100 with water to clean it out. This can be done after a specific number of deliveries have been performed, and/or it can be done after events such as a power cut or other interruption to a delivery, such as an adverse signal from a sensor within the apparatus 100 which results in shut-down. In any event, the main control PCB 101a sends a second operation signals to the manifold 1 to selectively direct incoming fluid to the outlet 3a which is connected to the drain 115. The PCB 6 issues the necessary run commands as described above to create such a fluid path. The main control PCB 101a also sends a third operation signal to the dilution manifold 103 to open the water inlet 109, and also operate the booster pump 110 if fitted. Water enters the dilution manifold 103 and flushes it of any residual chemical washing fluid. The water then passes down the inlet line 47, also flushing it of any residual chemical washing fluid. The water then enters the manifold 1 and passes through its components in the same manner as described above, thereby also flushing them of any residual chemical washing fluid. The water then passes to the drain 115. The third operation signal will involve a time interval for this action, and once this has passed the water inlet 109 is closed, and the apparatus 1 is again ready for normal operation.

The present invention can be altered without departing from the scope of claim 1. For example, in one alternative embodiment (not shown) the fluid outlets and the associated track are arranged in a curved configuration. In another alternative embodiment (not shown) the shelf has integral fluid outlets 3 rather than outlet connectors. In another alternative embodiment (not shown) the travelling, nut is formed inside the shuttle carriage rather than being mounted to its side.

In a further alternative embodiment (not shown) the movement of a conduit member for selectively fluidly connecting the fluid inlet to the fluid outlets is rotational about an axis, namely the fluid outlets are arranged radially around a central fluid inlet, a first end of the conduit member is rotationally mounted to the fluid inlet, and the conduit member is rotated by a suitable motor in order to selectively associate the second end of the fluid path with the fluid outlets.

Thus, the present invention provides a manifold for selectively directing diluted chemical washing fluid to industrial washing machines by using a moving delivery head which travels between the fluid outlets, rather than having static manifold pipework and solenoid values controlling each fluid outlet, as in known examples. The invention also provided a fluid delivery apparatus comprising such a manifold.

The invention claimed is:

1. A manifold comprises a fluid inlet, a plurality of fluid outlets, a conduit member, a first drive mechanism, a support member, and a control module in which said conduit member comprises a fluid path therethrough, in which said fluid inlet is fluidly connected to a first end of said fluid path, in which said support member comprises a track and in which said conduit member comprises a delivery head that is mounted for movement on the track, and in which said first drive mechanism is configured to move said delivery head on said track to selectively associate a second end of said fluid path with one of said plurality of fluid outlets according to commands issued by said control module, in which said plurality of fluid outlets are arranged in a line, in which said track is parallel to said line, in which at least a portion of aid fluid path which terminates at said second end thereof is normal to said line, and in which said first drive mechanism is configured to move said delivery head reciprocally on said track between positions in which said second end of said fluid patent is aligned with one said plurality of outlets.

2. A manifold as claimed in claim 1 in which said delivery head comprises a shuttle carriage mounted for movement on said track, a connector member and a second drive mechanism, in which said connector member comprises said fluid path therethrough and a probe portion with said second end of said fluid path at an outer end thereof, in which said connector member is mounted for movement on a guide provided at a front side of said shuttle carriage, in which said second drive mechanism is configured to move said connector member on said guide according to commands issued by said control module between a retracted position in which said outer end is level with or above a lower surface of said shuttle carriage and said delivery head can move freely on said track between said plurality of fluid outlets, and an advanced position in which said probe portion is proud of said lower surface and extends through one of said fluid outlets.

3. A manifold as claimed in claim 2 in which said guide comprises a plurality of guide shafts, in which said connector member comprises a body portion mounted to said guide shafts by means of a plurality of corresponding apertures formed therein, in which said probe portion extends from said body portion parallel with said guide shafts, in which said connector member comprises an arm portion which is normal to said probe portion and has said first end of said fluid path at an outer end thereof, and in which a fluid line extends from said fluid inlet to a first end of said fluid path and said fluid line is mounted to said arm portion.

4. A manifold as claimed in claim 3 in which said second drive mechanism comprises a linear motor mounted at one end of said guide, with a linear shaft thereof extending into said guide parallel with said guide shafts, in which said connector member comprises a socket in which said linear shaft is mounted.

5. A manifold as claimed in claim 4 in which said front side of said shuttle carriage is parallel with said line, in which said guide comprises three guide shafts arranged in an isosceles triangle configuration with the hypotenuse side thereof parallel with said front side, in which said body portion is a corresponding isosceles triangle shape with said apertures at each corner thereof, and in which said arm portion extends from a congruent side thereof at a normal angle thereto.

6. A manifold as claimed in claim 2 in which said track comprises a pair of parallel rods, in which said shuttle carriage is mounted to said rods by means of a pair of corresponding first openings formed therein, in which said first drive mechanism comprises a stepper motor mounted at one end of said track, with a lead screw thereof extending along said track parallel with said rods, and in which said shuttle carriage comprises a second opening formed therein through which said lead screw extends, and in which said shuttle carriage comprises a travelling nut mounted to said lead screw.

7. A manifold as claimed in claim 3 in which said manifold comprises a base comprising a back wall, a shelf normal to said back wall, and a pair of spaced apart supports normal to said back wall and said shelf, in which said fluid outlets are provided in said shelf, and in which said track is provided between said supports such that said delivery head travels over said shelf to access said fluid outlets.

8. A manifold as claimed in claim 7 in which said fluid inlet is located on a rear side of said back wall, in which a spout extends from a front side of said back wall, in which a fluid inlet path extends from said fluid inlet to an outer end of said spout, in which said fluid line comprises a resilient tube, a first end of which is mounted to said spout and a second end of which is mounted to said arm portion.

9. A manifold as claimed in claim 8 in which said spout is located on said back wall in a plane which dissects said line substantially halfway along the length of said line.

10. A manifold as claimed in claim 7 in which a plurality of tail sections extend from an underside of said shelf, in which said manifold comprises a plurality of fluid outlet paths, each one extending from one of said plurality of fluid outlets to an outer end of one of said tail sections, and in which said tail sections comprise annular formations for retaining outlet lines with which said manifold is used.

11. A manifold as claimed in claim 10 in which each of said fluid outlet paths comprises an annular seal member on an inner surface thereof, which annular seal member is spaced a shorter distance from the corresponding fluid outlet than the distance said probe portion extends from said lower surface, and in which said annular seal member forms a fluid seal against said probe portion when said probe portion is in said advanced position.

12. A manifold as claimed in claim 10 in which said shelf comprises a plurality of mounting slots, in which an outlet connector is removably mounted in each of said slots, in which each outlet connector comprises one of said fluid outlets at an upper end thereof and one of said tail sections, and defines one of said fluid outlet paths therethrough.

13. A manifold as claimed in claim 2 in which said shuttle carriage comprises a first position sensor on said front side and said connector member comprises a protrusion on a rear side thereof which interacts with said first position sensor to determine the position of said connector member on said guide.

14. A manifold as claimed in claim 1 in which said manifold comprises a second position sensor at a first end of said track, in which said delivery head comprises a surface which interacts with said second position sensor when said delivery head is positioned at said first end of said track.

15. A manifold as claimed in claim 9 in which said base comprises a delivery compartment housing said track, first drive mechanism, delivery head and fluid outlets, in which said base comprises a control compartment housing said control module, and in which control cables pass from said control module to said first drive mechanism and to said delivery head.

16. A manifold as claimed in claim 15 in which control cables pass from said control module to said delivery head via a control cable aperture provided in said back wall adjacent to said spout.

17. Fluid delivery apparatus comprising a main dosing unit, a plurality of pumps, a water dilution station, and a manifold as claimed in claim 1, in which each of said pumps is for pumping chemical washing fluid from a drum of chemical washing fluid with which said apparatus is used to said water dilution station, in which said water dilution station is configured to dilute said chemical washing fluid with water to form a dilution fluid and to direct it to said manifold, in which said manifold is for selectively directing said dilution fluid to one of a plurality of washing machines with which said apparatus is used, in which said main dosing unit is configured to send first operation signals to each of said pumps to pump chemical washing fluid from said drums to which they are connected to said water dilution station, in which said main dosing unit is configured to send second operation signals to said manifold to selectively direct said dilution fluid to one of said plurality of washing machines.

18. A manifold comprises a fluid inlet, a plurality of fluid outlets, a conduit member, a first drive mechanism, a support member, and a control module in which said conduit member comprises a fluid path therethrough, in which said fluid inlet is fluidly connected to a first end of said fluid path, in which said support member comprises a track and in which said conduit member comprises a delivery head that is mounted for movement on the track, and in which said first drive mechanism is configured to move said delivery head on said track to selectively associate a second end of said fluid path with one of said plurality of fluid outlets according to commands issued by said control module, in which said delivery head comprises a shuttle carriage mounted for movement on said track, a connector member and a second drive mechanism, in which said connector member comprises said fluid path therethrough and a probe portion with said second end of said fluid path at an outer end thereof, in which said connector member is mounted for movement on a guide provided at a front side of said shuttle carriage, in which said second drive mechanism is configured to move said connector member on said guide according to commands issued by said control module between a retracted position in which said delivery head is able to move freely on said track between said plurality of fluid outlets, and an advanced position in which said probe portion extends through one of said fluid outlets.

19. A manifold as claimed in claim 18 in which said outer end is level with or above a lower surface of said shuttle carriage in said a retracted position, and in which said probe portion is proud of said lower surface in said advanced position.

20. Fluid delivery apparatus comprising a main dosing unit, a plurality of pumps, a water dilution station, and a manifold as claimed in claim 18, in which each of said pumps is for pumping chemical washing fluid from a drum of chemical washing fluid with which said apparatus is used to said water dilution station, in which said water dilution station is configured to dilute said chemical washing fluid with water to form a dilution fluid and to direct it to said manifold, in which said manifold is for selectively directing said dilution fluid to one of a plurality of washing machines with which said apparatus is used, in which said main dosing unit is configured to send first operation signals to each of said pumps to pump chemical washing fluid from said drums to which they are connected to said water dilution station, in which said main dosing unit is configured to send second operation signals to said manifold to selectively direct said dilution fluid to one of said plurality of washing machines.

* * * * *